(12) United States Patent
Chao

(10) Patent No.: US 7,460,734 B2
(45) Date of Patent: Dec. 2, 2008

(54) METHOD AND APPARATUS OF ADAPTIVE INTERPOLATION BASED ON EDGE DETECTION

(75) Inventor: Po-Wei Chao, Taipei Hsien (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 769 days.

(21) Appl. No.: 10/905,222

(22) Filed: Dec. 22, 2004

(65) Prior Publication Data

US 2005/0141785 A1 Jun. 30, 2005

(30) Foreign Application Priority Data

Dec. 30, 2003 (TW) .............................. 92137484 A

(51) Int. Cl.
*G06K 9/32* (2006.01)
*G06K 9/48* (2006.01)

(52) U.S. Cl. ...................................... 382/300

(58) Field of Classification Search ................. 382/190, 382/199, 286, 299–300; 348/458–459, 441–448; 708/290

See application file for complete search history.

(56) References Cited

U.S. PATENT DOCUMENTS 6,133,957 A 10/2000 Campbell 6,421,090 B1 7/2002 Jiang et al.
6,810,156 B1 * 10/2004 Itoh ........................... 382/300

FOREIGN PATENT DOCUMENTS

CN 1281313 A 1/2001

* cited by examiner

*Primary Examiner*—Sherali Ishrat
(74) *Attorney, Agent, or Firm*—Winston Hsu

(57) ABSTRACT

An interpolation method based on edge detection includes: generating a measurement value of an edge direction according to a first pixel set and a second pixel set, wherein the first pixel set comprises at least a first pixel, the second pixel set comprises at least a second pixel, the first pixel and the second pixel are on opposite sides of the target location and define the edge direction, and the measurement value represents a measure of variance between the first pixel set and the second pixel set; according to the above step, generating a plurality of measurement values corresponding to a plurality of edge directions respectively; identifying a minimum measurement value from the plurality of measurement values; and calculating a value of the target pixel according to pixels of the first and second pixel sets corresponding to the minimum measurement value.

20 Claims, 3 Drawing Sheets

METHOD AND APPARATUS OF ADAPTIVE INTERPOLATION BASED ON EDGE DETECTION

BACKGROUND OF INVENTION

1. Field of the Invention

The present invention relates to a method and apparatus for interpolating pixels, and more particularly, to a method and apparatus for interpolating pixels based on edge detection.

2. Description of the Prior Art

In conventional interlaced scanning, each frame is actually composed of two fields: an odd field composed of odd scan lines and an even field composed of even scan lines, wherein the odd field and the even field of the same frame are successively scanned. In a de-interlacing process, the two fields are combined into one frame and then the frame is sequentially scanned at double horizontal scan frequency so that the quality of the display image is improved.

An interpolation operation is commonly employed in the de-interlacing process. In U.S. Pat. No. 6,133,957, an interpolation method is disclosed. The disclosed interpolation method identifies a first pair of pixel sets and a second pair of pixel sets on opposite sides of the vertical direction of the location where an additional pixel would be interpolated. The method performs an ambiguousness test based on the first and second pair of pixel sets to determine a weight factor used for interpolating the additional pixel.

Another interpolation method is disclosed in U.S. Pat. No. 6,421,090. The disclosed method is used for video having at least two fields. The method calculates a motion value of successive frames and then interpolates pixels based on the motion value.

As mentioned above, the interpolation method of the prior art needs to perform a complex ambiguousness test with two pairs of pixel sets or perform motion estimation with at least two fields, and these operations increase the complexity of interpolation and the cost of circuit implementation.

SUMMARY OF INVENTION

It is therefore an objective of the claimed invention to provide an interpolation method and apparatus to interpolate pixels based on edge detection.

According to the embodiment of the present invention, an interpolation method is disclosed. The interpolation method for generating a target pixel at a target location within a video image comprises: generating a plurality of measurement values, each of the measurement values corresponding to an edge direction and being generated according to a corresponding first pixel set and a corresponding second pixel set, wherein the first pixel set comprises at least a first pixel, the second pixel set comprises at least a second pixel, and the first pixel and the second pixel reside on opposite sides of the target location along the corresponding edge direction; identifying a minimum measurement value from the plurality of measurement values, and calculating a value of the target pixel according to pixels of the first and second pixel sets which correspond to the minimum measurement value.

In addition, the embodiment of the present invention provides an interpolation device for generating a target pixel at a target location within a video image. The interpolation device includes: a measuring circuit for generating a plurality of measurement values, wherein each measurement value corresponds to an edge direction and represents a measure of variance between a plurality of pixels which are on opposite sides of the target location and corresponding to the edge direction; an analysis circuit coupled to the measuring circuit for generating a reference value based on the pixels corresponding to a minimum measurement value and for generating a weight factor according to the minimum measurement value and at least one threshold value; and an interpolating circuit coupled to the analysis circuit for generating the target pixel according to a weighted calculation of the reference value based on the weight factor.

These and other objectives of the present invention will no doubt become obvious to those of ordinary skill in the art after reading the following detailed description of the embodiment that is illustrated in the various figures and drawings.

DETAILED DESCRIPTION

The embodiments of the present invention to be described herein may be implemented in analog, digital (including digital signal processing with software), or a hybrid of analog and digital techniques. In addition, the interpolation method of the present invention can be employed to interpolate vertical lines or horizontal lines within a video image. Horizontal interpolation is employed merely as an example throughout the following embodiments.

Figure 1:
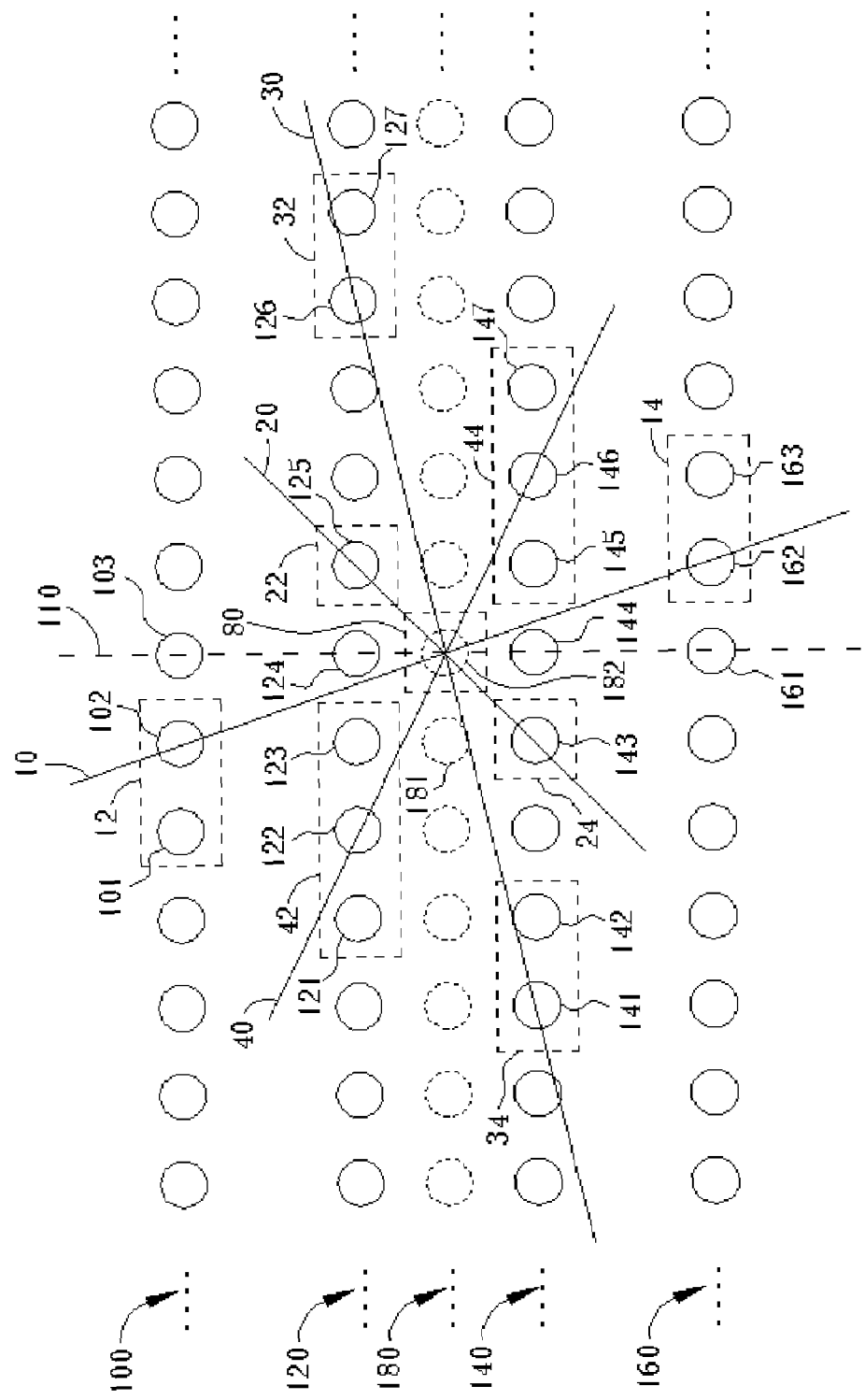
FIG. 1 is an illustration of a portion of a video image.

FIG. 1 depicts a portion of a video image. As shown in FIG. 1, pixels 101, 102 and 103 are located in a horizontal scan line 100; pixels 121, 122 to 127 are located in a horizontal scan line 120; pixels 141, 142 to 147 are located in a horizontal scan line 140; and pixels 161, 162 and 163 are located in a horizontal scan line 160. A horizontal scan line 180 is interpolated using pixels of the existing scan lines 100, 120, 140, or 160 in the following description.

Figure 2:
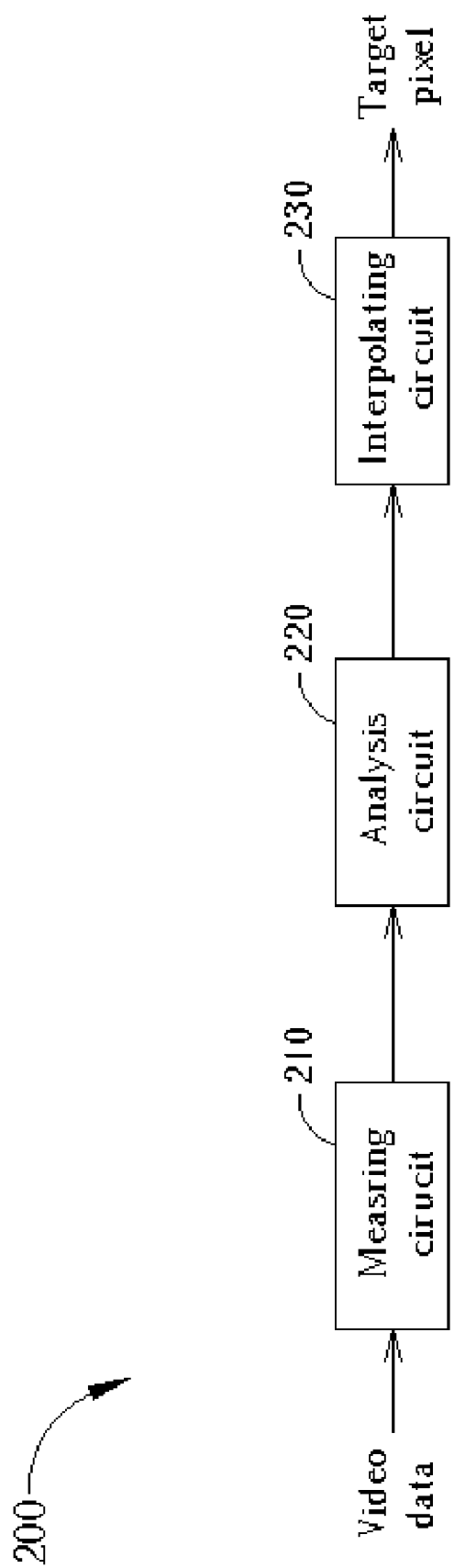
FIG. 2 is a block diagram of an interpolation device according to an embodiment of the present invention.

FIG. 2 illustrates a schematic diagram of an interpolation device 200 according to an embodiment of the present invention. The interpolation device 200 comprises a measuring circuit 210 for generating a plurality of measurement values according to existing pixels; an analysis circuit 220 coupled to the measuring circuit 210, for analyzing the plurality of measurement values and generating a weighting factor; and an interpolating circuit 230 coupled to the analysis circuit 220, for generating a target pixel 182 by weighted-blending the existing pixels according to the weighting factor, to generate a target pixel 182. The interpolation device 200 may also comprise one or more storage unit (not shown) for storing data produced in the course of interpolation process by the interpolation device 200. The utilization of storage unit is well known to those of ordinary skill in the art, and therefore is not detailed herein.

Figure 3:
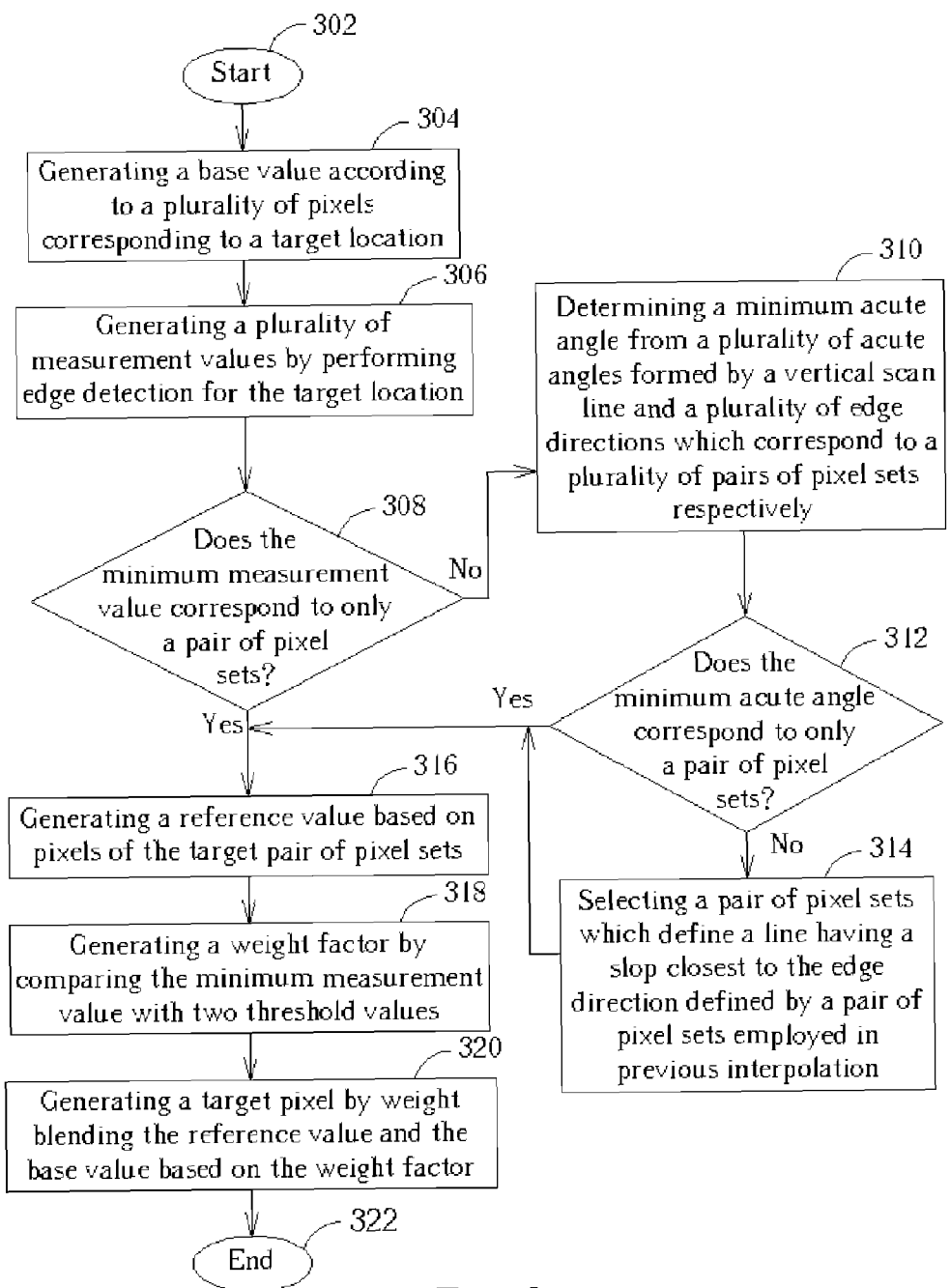
FIG. 3 is a flowchart of a method of interpolation according to an embodiment of the present invention.

FIG. 3 depicts a flowchart 300 of the method of operation for the interpolation device 200 according to an embodiment of the present invention. The flowchart 300 comprises following steps:

Firstly, the measuring circuit 210 performs step 304 to generate a base value according to a plurality of pixels corresponding to a target location 80 where the pixel 182 to be interpolated is located. In step 304, the base value could be obtained from the pixels on a vertical axis 110 of the target location 80. For example, the value of the pixel 124 (or 144), the average or weighted average of the two pixels 124 and 144, or the average or weighted average of the four pixels 103, 124, 144, and 161 could be employed as the base value. In practical implementations, the average, weighted average, or other numerically derived result of an operation on all or a portion of the pixels around the target location 80, such as pixels 123, 124, 125, 181, 143, 144, 145 and so on, could be employed as the base value.

In step 306, the measuring circuit 210 selects an edge direction, such as edge direction 10, based on the target location 80. The edge direction 10 corresponds to a pixel set 12 and a pixel set 14 residing on either sides of the vertical axis 110, wherein the pixel set 12 has two pixels 101 and 102, and the pixel set 14 has two pixels 162 and 163. The measuring circuit 210 then calculates a measurement value representing the result of edge detection of the edge direction 10 according to the pixels 101, 102, 162, or 163 of the pair of pixel sets 12 and 14. Here in this embodiment each pixel set has at least one pixel on the edge direction, i.e., on the axis extending through the target location 80 along such edge direction. For example, the pixel set 12 has the pixel 102 on the edge direction 10. However, the number and allocation of the pixels of each pixel set is not limited by this embodiment. Using the embodiment mentioned above as an example, the pixel set 12 comprises the pixel 102, which is on the edge direction 10, and the neighboring pixel 101, while the pixel value corresponding to the pixel set 12 could be an average of the pixels 102 and 101, or a weighted combination of the pixels 102 and 101 based on their allocation. The measuring circuit 210 calculates the difference in brightness values or in gray-scale values of pixels between the pixel set 12 and the pixel set 14 to obtain the measurement value. For color images, the measurement may present differences in levels of composite colors such as RGB, Y/I/Q, Y/U/V, Y/R-Y/B-Y, Y/Cr/Cb etc. In this embodiment, the measuring circuit 210, in step 306, calculates the sum of absolute difference (SAD) between the base value obtained in step 304 and the corresponding pixel value of each of the pixel sets on the edge direction, such as the first and the second pixel sets, to obtain the measurement value. While performing step 306, the measuring circuit 210 selects a plurality of edge directions, such as the edge directions 10, 20, 30 and 40, to respectively perform measurement value calculation corresponding to each selected edge direction.

Steps 308 through 314 illustrate an embodiment for identifying a pair of target pixel sets Target_Pair_182. The steps are described as follows:

Firstly, the analysis circuit 220 performs step 308 to determine if the minimum measurement value corresponds to only a single edge direction. If this condition is true, a pair of pixel sets corresponding to this single edge direction is employed to be the pair of target pixel sets Target_Pair_182 for the follow-up interpolation processes. Afterward, step 316 is performed. The smaller the measurement value obtained in step 304, the smaller the variance of the pixels of the edge direction corresponding to the measurement value. Step 310 is performed when the minimum measurement value corresponds to more than one edge direction. Each edge direction forms an acute angle with a vertical axis 110. In step 310, the analysis circuit 220 identifies an edge direction having a minimum acute angle. For example, if the minimum measurement value corresponds to the edge directions 10 and 20, the analysis circuit 220 compares the acute angles corresponding to the edge directions 10 and 20. Therefore, the edge direction 10, which forms the minimum acute angle with the vertical axis 110, is selected. On the other hand, if the two acute angles of the two edge directions are the same, the analysis circuit 220 performs step 314 to make a choice between the two. The analysis circuit 220 selects an edge direction having a slope which is closest to the slope of the line defined by a target pair of pixel sets Target_Pair_181 employed in a previous interpolation operation to be a selected edge direction. A pair of pixel sets on the selected edge direction is employed to be the target pair of pixel sets Target_Pair_182.

Next, in step 316, the analysis circuit 220 generates a reference value according to the target pair of pixel sets Target_Pair_182.

In step 318, the analysis circuit 220 generates a weight factor according to the minimum measurement value. In one embodiment of the present invention, the analysis circuit 220 generates the weight factor according to the relationship between the minimum measurement value and two threshold values. The smaller the minimum measurement value gets, meaning that the variance of pixels of the edge direction corresponding to the minimum measurement value is smaller, the weight of the reference value should have a greater value than that of the base value when weight-blending the reference value and the base value. Conversely, if the minimum measurement value increases, the weight of the reference value decreases. In a preferred embodiment of the present invention, the two threshold values are a lower limit threshold 10 and an upper limit threshold 28, and define a range from 10 to 28. The analysis circuit 220 divides such range into a plurality of intervals, for example, into nine equal intervals. If the minimum measurement value is located within the range, the weight of the reference value increases when the interval where the minimum measurement value is located lies closer to the lower threshold 10. For example, if the minimum measurement value is located within the first interval [10,12], the weight factor is set to 0.9; if it is located within the second interval [12,14], the weight factor is set to 0.8. Thus, if the minimum measurement value is located within the ninth interval [26,28], the weight factor is set to 0.1. If the minimum measurement value is not located within the range defined by the two threshold values, the weight factor can be determined based on the magnitude of the minimum measurement value. For example, if the minimum measurement value is greater than the upper limit threshold, the weight factor can be set to 0.

It should be appreciated by those of ordinary skill in the art that the order of the step 316 and step 318 could be exchanged without negatively influencing purpose of the present invention.

Next, step 320 is performed to generate a target value P_182 by weight-blending the reference value R_182 and the base value B_182 based on the weight factor W_182. In one embodiment, the interpolating circuit 230 obtains the target value P_182 by calculating:

$$P\_182 = R\_182 \times W\_182 + B\_182 \times (1 - W\_182)$$

In another embodiment of the present invention, the interpolating circuit 230 can simply employ the target value obtained in step 320 as the pixel value of the target pixel 182. In another embodiment of the present invention, the interpolating circuit 230 or a judging circuit (not shown) of the interpolation device 200 further performs a smoothness test for the target pixel 182. The interpolating circuit 230 selects an edge direction based on the target location 80 and determines if the target value is between the pixel values of two pixels on the selected direction. If the target value is between the two pixel values, the interpolating circuit 230 employs the target value as the pixel value of the target pixel 182. Otherwise, the interpolating circuit 230 employs the base value as the pixel value of the target pixel 182. The means for selecting the edge direction and the two pixels is similar to that depicted in step 306, and therefore, for brevity, further details are omitted. In practical implementations, the interpolating circuit 230 can select a plurality of edge directions to respectively perform the smoothness test to verify the adaptability of the target value. In this way, the smoothness of the target pixel 182 on different directions is improved.

The smoothness test mentioned above can be performed by the measuring circuit 210 in step 306 instead of being performed by the interpolating circuit 230 in step 320. In another embodiment, for example, the measuring circuit 210 generates a reference value according to the pixels of a pair of pixel sets on an edge direction, and then performs the smoothness test for the reference value on one or more edge directions as illustrated above. The measuring circuit 210 further generates a measurement value corresponding to the edge direction only if the reference value has passed the smoothness test.

In order to further improve the image quality of interpolated pixels, if the base value is generated according to pixels of a single edge direction in step 304, such as using an average of the pixels 124 and 144 of the vertical direction of the target location 80 as the base value, the analysis circuit 220 in step 318 may further fine-tune the weight factor according to the difference between the minimum measurement value and the measurement value corresponding to such single edge direction. A greater difference between the measurement value of the edge direction and the minimum measurement value represents a greater variance between pixels on the edge direction, and accordingly, the weight factor of the reference value should be increased for follow-up weight blending operations.

In another embodiment, the interpolating circuit 230 may also calculate an adjusting factor based on the difference between the measurement value of the edge direction and the minimum measurement value after the target value is obtained in step 320. The interpolating circuit 230 may then once again perform a weighted combination of the target value and the reference value based on the adjusting factor to generate an adjusted target value. Obviously, the image quality after interpolation is thereby improved by adjusting the weight factor based on the difference between the measurement value of the edge direction and the minimum measurement value. In this embodiment, the magnitude of the adjusting factor is determined based on the difference between the measurement value of the edge direction and the minimum measurement value, and the way of generating such adjusting factor is similar to that of generating the weight factor in step 318. Therefore, for brevity, further details are omitted.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An interpolation method for generating a target pixel at a target location within a video image, the method comprising:

generating a plurality of measurement values, each of the measurement values corresponding to an edge direction and being generated according to a corresponding first pixel set and a corresponding second pixel set, wherein the first pixel set comprises at least a first pixel, the second pixel set comprises at least a second pixel, and the first pixel and the second pixel reside on opposite sides of the target location along the corresponding edge direction;

identifying a minimum measurement value from the plurality of measurement values;

calculating a value of the target pixel according to pixels of the first and second pixel sets which correspond to the minimum measurement value;

generating a weight factor according to the minimum measurement value and at least one threshold value; and obtaining the value of the target pixel by weight-blending the first and second pixel sets corresponding to the minimum measurement value according to the weight factor.

2. The interpolation method of claim 1, wherein if the minimum measurement value increases, the weight factor decreases.

3. The interpolation method of claim 1, further comprising:
   defining a reference line according to the target location;
   generating a base value according to at least one pixel corresponding to the reference line; and
   obtaining the value of the target pixel by weight-blending the first and second pixel sets corresponding to the minimum measurement value, and the base value.

4. The interpolation method of claim 1, further comprising:
   generating a base value according to at least one of the pixels around the target location; and
   obtaining the value of the target pixel by weight-blending the first and second pixel sets corresponding to the minimum measurement value, and the base value.

5. The interpolation method of claim 1, wherein the at least one threshold value comprises at least a first threshold value and a second threshold value, the first and second threshold values define a range being divided into a plurality of intervals, wherein each interval corresponds to a weighting value and the weight factor corresponds to an interval where the minimum measurement value is located.

6. The interpolation method of claim 1, further comprising:
   adjusting the weight factor based on the difference between the minimum measurement value and at least one measurement value corresponding to the plurality of edge directions.

7. The interpolation method of claim 1, further comprising:
   determining if the obtained value of the target pixel is between the pixel value of the first pixel set and the pixel value of the second pixel set, wherein the first and second pixel sets correspond to one of the plurality of edge directions.

8. An interpolation method for generating a target pixel at a target location within a video image, the method comprising:

generating a plurality of measurement values, each of the measurement values corresponding to an edge direction and being generated according to a corresponding first pixel set and a corresponding second pixel set, wherein the first pixel set comprises at least a first pixel, the second pixel set comprises at least a second pixel, and the first pixel and the second pixel reside on opposite sides of the target location along the corresponding edge direction;

identifying a minimum measurement value from the plurality of measurement values, and calculating a value of the target pixel according to pixels of the first and second pixel sets which correspond to the minimum measurement value;

wherein when the minimum measurement value corresponds to a plurality of edge directions, the method further comprises:

defining a detecting direction based on the target location, the detecting direction forming a plurality of acute angles with the plurality of edge directions corresponding to the minimum measurement value; and selecting a first pixel set and a second pixel set from one of the plurality of edge directions corresponding to the minimum angle of the plurality of acute angles in order to calculate the value of the target pixel;

wherein the detecting direction is the vertical direction of the target location, and when the minimum acute angle simultaneously corresponds to a first edge direction and a second edge direction, the method further comprises:

comparing the difference between an old direction and the first edge direction with the difference between the old direction and the second edge directions to select a first pixel set and a second pixel set from one of the first and second edge directions according to the comparison result in order to calculate the value of the target pixel, wherein the old direction corresponds to the first and second pixel sets being employed when calculating a previous target pixel.

9. The interpolation method of claim 8, wherein the detecting direction is the vertical direction of the target location.

10. The interpolation method of claim 1, wherein the measurement value represents a measure of variance between the first pixel set and the second pixel set.

11. An interpolation device for generating a target pixel at a target location within a video image, the interpolation device comprising:

a measuring circuit for generating a plurality of measurement values, wherein each measurement value corresponds to an edge direction and represents a measure of variance between a plurality of pixels which correspond to the edge direction and are on opposite sides of the target location;

an analysis circuit coupled to the measuring circuit for generating a reference value based on the pixels corresponding to a minimum measurement value and for generating a weight factor according to the minimum measurement value and at least one threshold value; and an interpolating circuit coupled to the analysis circuit for generating the target pixel according to a weighted operation of the reference value based on the weight factor.

12. The interpolation device of claim 11, wherein the interpolating circuit further comprises:

a judging circuit for determining if the value of the target pixel is between a plurality of pixels, wherein the plurality of pixels correspond to at least one of the plurality of edge directions and are on opposite sides of the target location.

13. The interpolation method of claim 8, wherein the detecting direction is the vertical direction of the target location.

14. The interpolation method of claim 8, further comprising:

generating a weight factor according to the minimum measurement value and at least one threshold value; and obtaining the value of the target pixel by weight-blending the first and second pixel sets corresponding to the minimum measurement value according to the weight factor.

15. The interpolation method of claim 14, wherein if the minimum measurement value increases, the weight factor decreases.

16. The interpolation method of claim 14, further comprising:

defining a reference line according to the target location;

generating a base value according to at least one pixel corresponding to the reference line; and obtaining the value of the target pixel by weight-blending the first and second pixel sets corresponding to the minimum measurement value, and the base value.

17. The interpolation method of claim 14, further comprising:

generating a base value according to at least one of the pixels around the target location; and obtaining the value of the target pixel by weight-blending the first and second pixel sets corresponding to the minimum measurement value, and the base value.

18. The interpolation method of claim 14, wherein the at least one threshold value comprises at least a first threshold value and a second threshold value, the first and second threshold values define a range being divided into a plurality of intervals, wherein each interval corresponds to a weighting value and the weight factor corresponds to an interval where the minimum measurement value is located.

19. The interpolation method of claim 14, further comprising:

adjusting the weight factor based on the difference between the minimum measurement value and at least one measurement value corresponding to the plurality of edge directions.

20. The interpolation method of claim 14, further comprising:

determining if the obtained value of the target pixel is between the pixel value of the first pixel set and the pixel value of the second pixel set, wherein the first and second pixel sets correspond to one of the plurality of edge directions.

* * * * *